Nov. 21, 1939.  D. HEYER  2,180,678
ADJUSTABLE SPEED DRIVE
Filed June 26, 1934  3 Sheets-Sheet 2
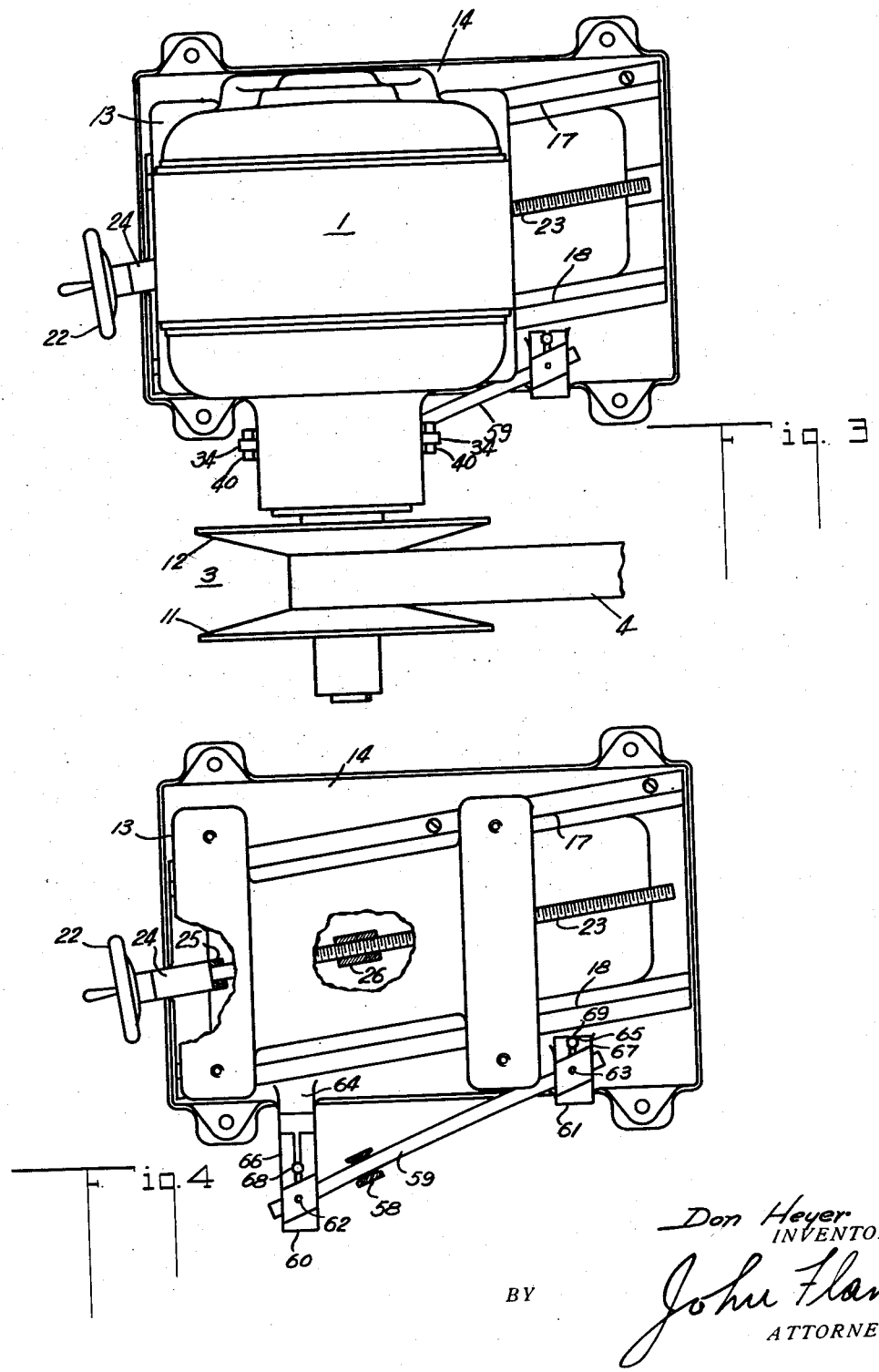
Don Heyer
INVENTOR
BY John Flam
ATTORNEY Nov. 21, 1939.                    D. HEYER                    2,180,678
                          ADJUSTABLE SPEED DRIVE
                          Filed June 26, 1934          3 Sheets-Sheet 3

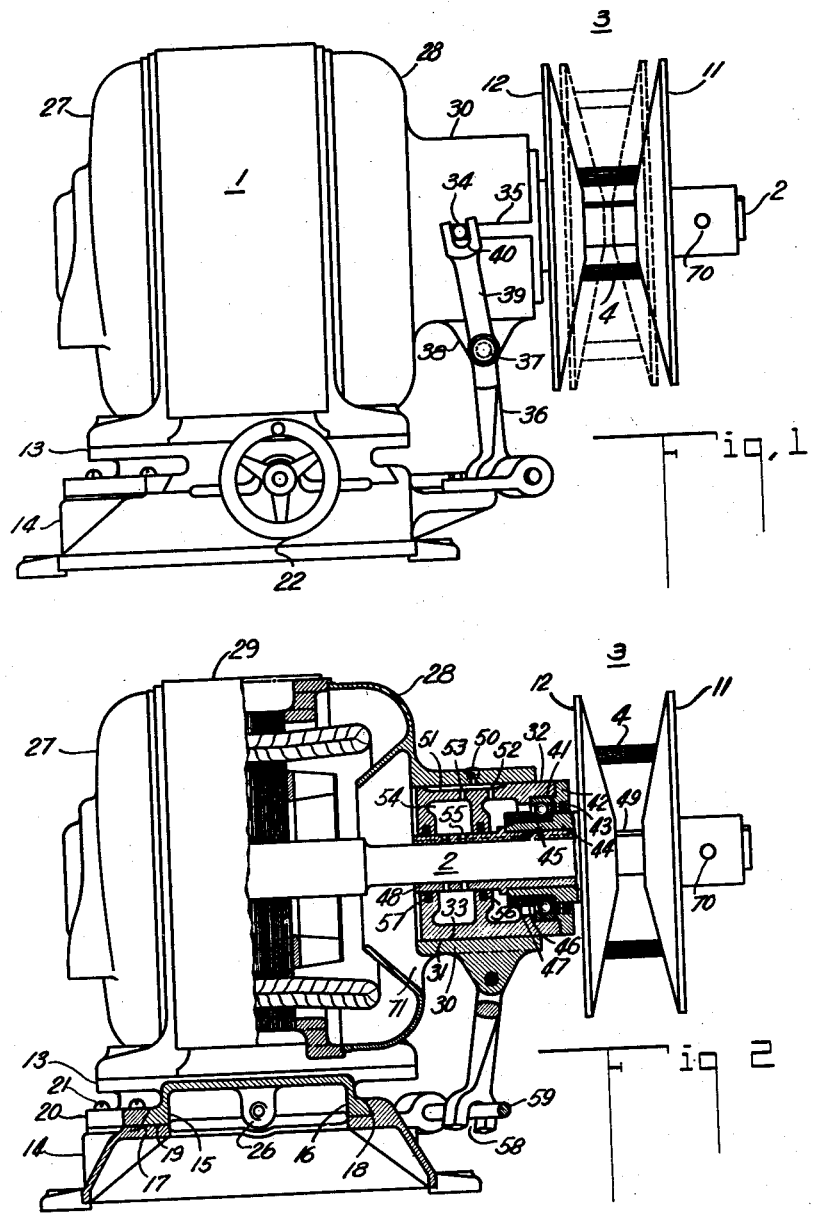

Don Heyer
                                                INVENTOR
                              BY              John Flam
                                                ATTORNEY Patented Nov. 21, 1939

2,180,678

UNITED STATES PATENT OFFICE 2,180,678

ADJUSTABLE SPEED DRIVE

Don Heyer, Los Angeles, Calif., assignor to U. S. Electrical Motors, Inc., a corporation of California Application June 26, 1934, Serial No. 732,452

14 Claims. (Cl. 74—230.17)

This invention relates to an adjustable speed drive and more particularly to an integral construction incorporating a driving electric motor.

Preferably the variation in speed is obtained by the aid of a belt and a pulley structure having an adjustable effective diameter. The adjustable effective diameter may be obtained by the use of a pulley structure having a pair of pulley sections with opposed inclined belt engaging faces which form by relative axial adjustment variable effective pulley diameters.

The power may be transmitted to a driven load by means of a load driving shaft having a driven pulley structure mounted thereon and which engages a belt driven by a driving pulley structure, mounted on the driving shaft of the variable speed drive.

The relative speeds of the two shafts may be adjusted by providing means for the adjustment of the effective diameter of one or both of the pulley structures.

The belt or power transmitting member employed has a substantially constant effective length. This fact gives rise to the problem of adjusting a belt of constant length to pulleys of relatively variable effective diameter. This problem may be solved by several methods and with various degrees of accuracy, which are dependent on the type of construction employed and on the dimensions utilized in the construction.

It is an obvious fact that constructions may be devised which apparently give an accurate mathematical solution of a mechanical problem but which are nevertheless incapable of accurate mechanical construction and successful operation.

It is accordingly an object of this invention to provide a construction which is capable of adjusting a belt of constant length to pulleys of relatively variable effective diameter, during the continuous operation of the belt in a power transmitting capacity.

There are many variable speed power applications for which it is not convenient to adjacently locate the driving and driven pulleys. The device to be described hereinafter is of particular utility in such instances. However, it may also be employed with equal success where the two pulley structures are adjacently located. In this device means are provided for adjusting the effective means diameter of only one pulley structure; the other pulley structure may be of fixed diameter and of the type commonly employed in V belt or flat belt drives. With this construction the belt may be adjusted to the relatively adjustable pulley diameters by means of a compensating variation in the center distance between the axes of the two pulley structures.

In the construction to be described hereinafter positive means are provided for adjusting the effective diameter of the variable diameter pulley. The problem thus arises of adjusting the diameter of the adjustable pulley to the value required by the adjusted center distance between the axes of the pulley structures and by the remaining dimensions of the construction.

It is accordingly still another object of this invention to provide a variable speed drive in which both the center distance between the axes of the pulleys and the diameter of the adjustable pulley structure are interlockingly adjusted in a positive and accurate manner.

When only one adjustable diameter pulley is employed, it is necessary to maintain the belt in a fixed plane of travel if misalignment of the belt is to be avoided. In the form of the device to be described hereinafter one pulley section of the adjustable diameter pulley is axially fixed to its shaft and means are provided for adjusting the axial position of the other pulley section with respect to the fixed pulley section. The condition that the belt be maintained in fixed axial position requires that both of the pulley sections of the adjustable pulley be moved in opposite axial directions with respect to the belt. This may be accomplished by moving the shaft and the pulley section axially secured thereto in one axial direction and the other pulley section in the opposite axial direction. It now becomes necessary to correlate this adjustment of the pulley structure with the adjustment of the center distance between the axes of the two pulley structures.

It is accordingly still another object of this invention to adjust the members of the adjustable pulley structure interlockingly with the adjustment of the center distance between the axes of the two pulley structures in the manner required to maintain the belt in substantially perfect alignment and at a substantially constant initial tension.

The variation in speed which may be obtained by adjustment of the effective pulley diameter is a function of the belt width and of the pulley dimensions.

It is accordingly still another object of the invention to provide a variable speed drive which will operate successfully with a maximum speed range for a given belt width and motor speed.

The relative rates at which the members of the adjustable pulley structure and the center distance must be adjusted are a function of the particular pulley dimensions, belt length, and mounting dimensions.

It is accordingly still another object of this invention to provide a variable speed drive which may be readily adjusted to successfully operate through a wide range of operating requirements.

As the belt wears or slightly elongates the relation of the belt to the pulley structures and to the adjusting mechanism will change.

It is accordingly still another object of this invention to provide means for adjusting the variable speed drive to compensate for belt wear or variations in the dimensions of individual belts.

It is still another object of this invention to provide a positively adjusted pulley structure which may be adapted to a driving electric motor with a minimum of alteration of existing motor construction.

It is still another object of this invention to provide means for adequately and rigidly supporting all the adjustable structure of the variable speed drive.

It is still another object of this invention so to actuate the speed adjustment that the load imposed on the adjusting mechanism is reduced to a minimum.

It is still another object of this invention to accessibly locate the actuating mechanism of the speed adjustment at a location which will afford a maximum of safety to the operator.

It is still another object of this invention to provide means for assuring the unrestricted operation of the speed adjusting mechanism during continuous operation of the drive in a power transmitting capacity.

It is still another object of this invention so to combine the functions of the component mechanisms that a simple, compact, and rugged unit is obtained thereby.

This invention possesses many other advantages, and has other objects which may be made more easily apparent from a consideration of an embodiment of the invention. For this purpose there is shown a form in the drawings accompanying and forming part of the present specification. This form will now be described in detail, which illustrates the general principles of the invention; but it is to be understood that this detailed description is not to be taken in a limiting sense, since the scope of the invention is best defined by the appended claims.

Referring to the drawings:

Figure 1 is a side elevation of the driving member of a power unit embodying the invention. This view is in a plane parallel to the motor shaft, and illustrates the general relation of the various members associated with the driving motor. The belt is shown in section in order better to illustrate the shape of the pulley sections.

Figure 2 is a vertical section along the axis of the driving shaft of Figure 1. This view illustrates the construction of the speed adjusting mechanism.

Figure 3 is a plan view taken from the top of Figure 1. This view illustrates in particular the compact arrangement of the construction and the angular relation of the motor axis to the adjusting guides.

Figure 4 is a plan view of the adjustable base of Figure 3 with the motor removed. This view illustrates the relation of the members of the speed adjusting mechanism which are associated with the motor base.

Figure 5:
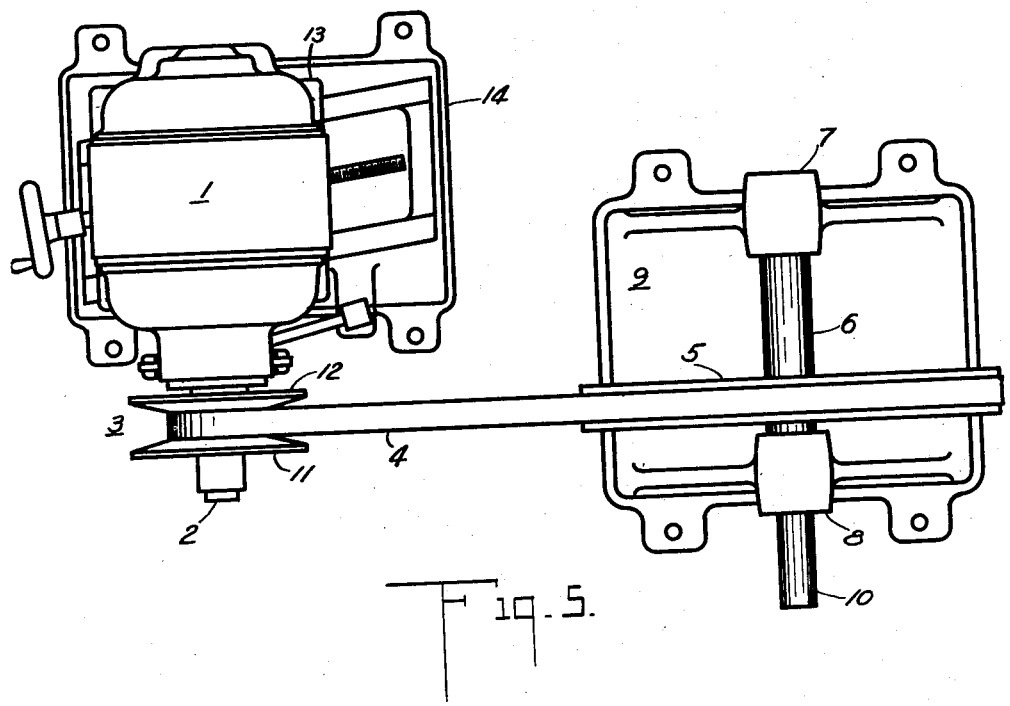
Figure 5 is a plan view taken from the top and right hand side of Figures 1 and 3. This view illustrates the relation of the driven pulley structure to the motor and to the speed adjusting mechanism.

In the present instance a driving electric motor 1, (Figure 1) is provided with a driving shaft 2 adapted to have mounted thereon an adjustable pulley structure 3. Pulley structure 3 is in driving relation to belt 4, which in turn engages a driven pulley 5 (Fig. 5). Pulley 5 is in axial driving relation to shaft 6. In many instances shaft 6 may be in direct driving relation to a driven load such as a ventilating fan or any other mechanism which may be directly actuated by means of a driven shaft. In Figure 5 shaft 6 is shown suitably journaled in supports 7 and 8 which may in turn be supported by supporting base 9. Driven shaft 6 may be provided with a load driving extension 10 which may be provided with suitable means for engaging a driven load.

In the present instance driven pulley 5 may be a fixed diameter pulley of the type commonly employed in flat belt or V belt drives. The adjustable pulley structure 3 is provided with a pulley section 11 which is axially fixed to the driving shaft and a pulley section 12 which is axially adjustable with respect to the driving shaft. Both of the pulley sections may be splined to shaft 2 by means of key 49. Pulley section 11 may be secured to shaft 2 in fixed axial position by means of set screw 70. Each of the pulley sections are formed with opposed inclined belt engaging faces which form by relative axial adjustment variable effective pulley diameters. For instance if it is desired to increase the effective diameter of the adjustable pulley structure, pulley section 12 may be moved axially toward pulley section 11. This in turn forces driving belt 4 radially outward to define a larger effective diameter. Conversely an axial movement of pulley section 12 away from pulley section 11 allows belt 4 to move radially inward to define a smaller effective pulley diameter.

It has been stated that the driven pulley 5 may be of fixed effective diameter and of the type commonly employed in V belt drives. This limitation of the construction requires that the belt remain in fixed axial position with respect to the driven pulley. If the driven pulley is in turn axially fixed to shaft 6, the requirement is that the belt travel in fixed axial position. Now if it is desired to maintain the belt in alignment with respect to the driving and driven pulley structures the limitation of the construction requires that the belt be restrained to travel in a fixed plane normal to the axes of the driving and driven shafts.

If it is desired to maintain the belt in a fixed axial plane for all the positions of the adjustable pulley structure, then both sections 11 and 12 must be relatively adjustable with respect to belt 4. Thus as viewed in Figure 1, if it is desired to increase the pulley diameter, pulley section 12 is moved toward the right and pulley section 11 is moved an equal distance toward the left. Belt 4 is in turn forced radially outward but is maintained in a fixed axial plane. The pulley sections and belt thus move to the positions indicated by the dotted lines of Figure 1.

Pulley section 11 however is axially fixed with respect to the driving shaft 2. Thus in order to obtain the required motion of pulley section 11, motor 1 together with shaft 2 and pulley section 11 must be provided with adjusting means for obtaining the required axial movement. This motion of pulley section 11 must be so interlocked with the adjustment of pulley section 12 that the two pulley sections are adjusted oppositely by substantially equal amounts with respect to belt 4.

The facts that belt 4 is of substantially constant effective length, and that the driven pulley 5 is of constant effective diameter require a further adjustment of the driving pulley and of the motor structure. If the effective diameter of the driving pulley structure is increased, the center distance between the axes of shafts 2 and 6 must be decreased to accommodate the belt of fixed length to the increased pulley diameter. Conversely a decrease in the effective diameter of adjustable pulley 3 requires that the center distance between the axes of the driving and driven shafts be increased.

To provide the required adjustments of the motor structure, the motor 1 is mounted on an adjustable sliding motor base 13 which is in turn guided and supported by a sub-base 14. Motor base 13 may be suitably supported and guided in its movement with respect to the sub-base by means of a tongue and groove construction. For this purpose base 13 is provided with tongue members 15 and 16. Tongues 15 and 16 are respectively in engagement with grooves 17 and 18. Groove member 17 is shown as consisting of a surface 19 formed on the sub-base and an engaging surface formed on a removable member 20.

This construction is of particular utility in that it permits the ready adjustment of the sliding clearance between the tongue members of the sliding base and the grooved members of the sub-base. Member 20 may be adjusted with respect to the sub-base to obtain the desired sliding clearance. Member 20 may then be secured in place by suitable means such as bolts 21.

The angular relation of the guide members 17 and 18 to the motor axis and to the plane normal to the motor axis is illustrated in Figures 3, 4 and 5. If it is desired to increase the effective diameter of the adjustable pulley structure, the axis of the motor shafts must be moved toward the axis of the driven shaft. At the same time pulley section 11 and motor 1 must be moved toward the left as viewed in Figure 1. Thus as viewed in Figures 3, 4 and 5 the motor shaft must move laterally toward the right and simultaneously with this motion the motor must be moved axially toward the top of the page. This simultaneous adjustment of the lateral and axial position of the motor may be exactly satisfied by the choice of a proper value for the guide angle for the sliding base. This angle is a variable dependent on the particular values of the effective pulley diameters and of the center distance between the axes of the shafts. However, an intermediate value may be chosen for the guide angle, such that the required adjustment may be substantially provided throughout the range of adjustment of the variable speed drive.

Appropriate means may be provided for adjusting the position of the sliding base and the supported motor. In the present instance a lead screw mechanism is provided for this purpose. A hand wheel 22 (Figures 3 and 4), is suitably secured to a lead screw 23. Lead screw 23 is rotatably supported by bushing 24 which is in turn secured to sub-base 14. Lead screw 23 is held in fixed axial position with respect to bushing 24 by locknuts 25 and the hub of hand wheel 22. Lead screw 23 engages threaded bushing 26 which may be secured to sliding base 13 or may be formed integral therewith. It is obvious from the construction, that the position of the sliding motor base and the supported motor may be adjusted by rotating hand wheel 22. The adjusting mechanism also effectively locks the motor base in the adjusted position, as the angle of lead of the lead screw may be made sufficiently small to prevent a force exerted on the motor base from rotating the lead screw, and thereby changing the adjustment.

The mechanism whereby the motor and the pulley section, secured to the motor shaft, are adjusted in accordance with the requirements of the construction has been disclosed. Consider now the means provided for adjusting the position of pulley section 12 which is axially slidable with respect to the motor shaft.

Referring to Figures 1 and 2, motor 1 may be provided with one end bracket 27 which is of the normal type employed in motor construction. The other end bracket 28 is of special construction. However, end bracket 28 may be machined to fit the normal stator dimensions. Brackets 27 and 28 may be secured to stator 29 by bolts or other suitable means.

The normal motor ventilation may be maintained by means of ventilating aperture 71 provided in end bracket 28. Ventilating aperture 71 may provide access to the motor for the entrance or exit of cooling air.

End bracket 28 is provided with a control housing member 30. Housing 30 has an internal cylindrical surface 31 formed thereon, co-axial with the motor shaft. A bearing housing 32 is slidably supported by surface 31. Bearing housing 32 has an exterior cylindrical surface 33 formed thereon co-axial with the motor shaft. The contact of cylindrical surfaces 31 and 33 serves to adequately support bearing housing 32 and to permit axial movement thereof. Bearing housing 32 is provided with two oppositely placed radially projecting pins 34. Housing 30 is provided with a pair of longitudinal slots 35 which respectively accommodate pins 34. The engagement of pins 34 with slots 35 prevents rotation of bearing housing 32 but permits axial movement thereof. The axial position of bearing housing 32 is adjusted by forked lever 36. Lever 36 is pivotably supported by pin 37, which is in turn supported by an extending ear 38 formed on end bracket 28. Forked lever 36 is provided with forked arms 39 which have slotted ends 40. Slotted ends 40 engage pins 34 which are secured to the bearing housing. It is obvious that a rotation of forked lever 36 about pivot pin 37 results in an axial adjustment of bearing housing 32.

End bracket 27 may be provided with a bearing housing and a bearing for rotatably supporting one end of the motor shaft. The other end of the motor shaft is rotatably supported by bearing 41. Bearing 41 has one race secured to bearing housing 32 by bearing cap 42. Bearing cap 42 may be provided with lubricant retaining seal 43. The other race of bearing 41 is secured to hub 44 of adjustable pulley section 12. Hub 44 is provided with an extended cylindrical surface 45 formed coaxial with the motor shaft. Bearing 41 may be secured by hub 44 at any position within the limits of surface 45 by means of spacing rings 46 and lock nut 47. By this construction the axial position of pulley section 12 may be adjusted with respect to bearing housing 32 to accommodate the pulley structure to belts of widely different dimensions.

Hub 44 is provided with an internal bushing 48 which may be pressed into hub 44 and suitably fastened in place as by means of locking pins. Bushing 48 may be made of bronze having a relatively high lead content or of a similar lubricant retaining, non-corrodible material. Bushing 48 may be slidably splined to shaft 2 by means of key 49.

With the construction provided, the axial position of pulley section 12 may be adjusted by a rotation of forked lever 36 about pivot pin 37. A rotation of lever arm 36 produces an axial adjustment of bearing housing 32, bearing 41, and pulley section 12.

This construction requires that bushing 48 be freely slidable with respect to shaft 2 under all operating conditions. As has been stated bushing 48 is made of a non-corrodible lubricant retaining material. That portion of motor shaft 2 which comes into contact with bushing 48 is provided with a hard glazed surface of a wear and corrosion resisting material. This surface may be formed in the following manner. The shaft may be ground to a diameter from .001 to .010 inch less than the desired finished diameter. A deposit of hard chromium plate is then formed on the shaft surface until the diameter is built up to several thousandths of an inch greater than the finished diameter. The shaft is then ground to the finished dimension to give a hard glazed finish. Obviously other means such as case hardening or chemical treatment may be employed to obtain a hard smooth surface on the shaft. However, the success of the particular method employed to prepare the shaft surface is dependent on the length of time that the adjustable diameter pulley may be operated at a fixed position without binding of the shaft inside of the bushing of the axially adjustable pulley section.

To maintain a free sliding fit between shaft 2 and bushing 48 presents a difficult problem. Although there is no relative rotational movement between the two parts, there is a combined rolling and sliding action, because these two parts are not integrally joined but have instead a slight sliding clearance. For each revolution of the motor, shaft 2 rolls a distance inside of bushing 48 equal to the circumference of the shaft and slides a distance equal to the difference in circumference of the interior of the bushing and of the shaft. This rolling action quickly works the lubricant out from between the contacting surfaces.

Although there is a slight relative sliding action, the difference in the circumference of the bushing and of the shaft is so small that a portion of the shaft surface always comes in contact with the same portion of the bushing surface. Commercially it is not practical to form true cylindrical surfaces. The bushing and shaft will actually come into contact only at the projecting portions of their surfaces. If there were a considerable sliding action, these projecting surfaces would be quickly worn down until the contact would be quite evenly distributed. In the absence of such motion the compression stress between the surfaces remains localized. The rolling and pounding action of the bushing on the shaft produces local heating at the points of highest stress. If this stress is too great for the material a rapid corrosion takes place unless the material is corrosion resisting. A scale is formed on the contacting surface, which binds the shaft inside of the bushing. This binding may be so tight at times, that a gear puller or a press is required for pulling the bushing off the shaft. It is obvious that the whole speed adjusting mechanism is rendered inoperative unless the axially movable pulley section is maintained freely slideable.

The problem to be overcome in the present instance is not essentially that of lubricating relatively sliding surfaces. Where there is a continuous sliding motion between two surfaces, the problem of lubrication is not difficult. The wiping action of the two surfaces draws a film of lubricant between the relatively sliding parts. Any of the conventional bearing structures will operate successfully under such conditions. In the present instance this is not the case. The adjustable pulley structure may be operated at one position for several days. With a conventional construction, all of the lubricant will have been forced out from between the contacting surfaces during this time. The localized stresses will have caused scale to form between the supporting surfaces. Now if it is desired to adjust the pulley structure the pulley section and the shaft will be found joined together with a force which will effectively oppose any effort to adjust the effective diameter of the pulley structure.

The present construction permits a solution of the problem. The glazed wear and corrosion resisting surface of shaft 2 acts to prevent seizure of the contacting surfaces. By making bushing 48 of a porous lubricant retaining material, a supply of lubricant is retained at the contacting surfaces. Such lubricant retaining materials, however, are not capable of withstanding large unit stresses. It therefore becomes necessary so to modify the construction that a large contacting surface is available. This is provided in the present construction by providing a long bushing 48.

Bearing housing 32 is also constructed to permit a free sliding action between surface 33 and the supporting surface 31 of member 30. By the present construction this surface can be made of sufficient axial length and area to reduce the unit stress to a very low value. This permits the use of lubricants which have a low viscosity at all operating temperatures.

Suitable means may be provided for renewing the supply of lubricant required by the pulley structure. In the present instance housing 30 is provided with a lubricating aperture 50. Aperture 50 may be threaded to accommodate the conventional type of lubricating fixtures employed with pressure lubricators. Aperture 50 terminates adjacent to groove 51 formed on the exterior surface of bearing housing 32. Groove 51 serves to distribute the lubricant over contacting surfaces 31 and 33. Apertures 52 and 53 are provided for conducting lubricant from groove 51 to the interior of the bearing housing. Aperture 52 serves to provide lubricant for bearing 41. Aperture 53 conducts lubricant into chamber 54, from which it is in turn conducted to the supporting surfaces of bushing 48. For this purpose bushing 48 may be provided with apertures 55 and appropriate lubricating grooves adjacent to the shaft surface.

Lubricant retaining chamber 54 is provided with lubricant retaining seals 56 and 57. If it is desired to employ a different type of lubricant for bearing 41 than that which is supplied to bushing 48, separate lubricating apertures and grooves similar to aperture 50 and groove 51 may be provided for bearing 41 and bushing 48. It is obvious from the nature of the construction that lubricant may be injected through aperture 50 during the continuous operation of the motor. Thus the entire construction of the adjustable diameter pulley co-operates to produce a variable speed drive which is adjustable under all operating conditions.

The manner in which the effective diameter of the adjustable diameter pulley structure may be adjusted by pivoting forked lever 36 about pivot pin 37, has been disclosed. Consider now the means by which this adjustment of the pulley structure is actuated by the rotation of hand wheel 22. For this purpose forked lever 36 may be provided with a slotted end 58 which engages guide rod 59. If it is desired to increase the effective diameter of pulley structure 3, then pulley section 12 must be moved toward the right as viewed in Figures 1 and 2. This necessitates a motion to the left of slotted head 58 with respect to pivot pin 37. An increase in effective diameter of pulley structure 3 also requires that the axis of motor shaft 2 be moved toward the axis of driven shaft 6. This motion may be provided by positioning guide rod 59 as shown by Figures 3 and 4. As the axis of motor shaft 2 is moved toward the right to approach the axis of the driven shaft, guide rod 59 moves slotted head 58 of forked lever 36 toward the top of the page as viewed in Figures 3 and 4, which in turn causes bearing housing 32 and pulley section 12 to move axially toward the driving belt to increase the effective diameter of adjustable pulley structure 3.

Conversely if it is desired to decrease the effective diameter of pulley structure 3, hand wheel 22 is rotated to adjust the sliding base in the direction required to increase the distance between the axis of the motor shaft and the axis of the driven shaft. In response to this adjustment, guide members 17 and 18 move the motor structure axially in the direction required to withdraw pulley section 11 away from the driving belt. Likewise guide rod 59 actuates the adjusting mechanism of pulley section 12 to withdraw pulley section 12 a substantially equal distance away from the driving belt. Pulley sections 11 and 12 are axially withdrawn the required distance from the driving belt to allow the belt to move radially inward toward the axis of the pulley structure to define the effective pulley diameter required by the increased center distance. Thus the entire mechanism is interlockingly adjusted in the manner required to maintain the belt in substantially perfect alignment and at a substantially constant initial tension for all positions of the adjustable speed drive.

The dimensions of the belt and of the pulley sections of the adjustable pulley structures are a function of the mounting dimensions and of the speed and power requirements at the driven shaft. It is thus desirable to provide a variable speed mechanism which is readily adaptable to a wide range of speed and power requirements. The manner in which the adjustable pulled section may be adjusted to accommodate belts of different widths has already been disclosed. It is, of course, possible to construct the entire variable speed drive to meet particular belt, pulley and mounting dimensions. However, it is possible to adapt the variable speed drive to a wide range of operating conditions by providing means for adjusting the position of the members of the variable speed drive to accommodate particular pulley, belt and mounting dimensions. If such adjusting means are provided it is possible to install the driving unit of the variable speed drive by first locating the sub-base in approximately the required position with respect to the driven mechanism. The driving motor may then be adjusted to any desired position by means of the sliding motor base. The belt may then be brought into alignment and to correct driving diameter and tension by adjusting the axial positions of pulley sections 11 and 12. Pulley section 11 may then be secured to motor shaft 2 in the required axial position. The axial position of pulley section 12 may then be interlocked with the adjusted position of motor base 13 by locking guide rod 59 in the position required by the adjusted position of pulley section 12.

It thus becomes desirable to provide means whereby the position of guide rod 59 may be adjusted with respect to the motor base. For this purpose guide rod 59 is provided with adjustable supports 60 and 61 at either end. Set screws 62, and 63 may be provided for securing the guide rod respectively to supports 60 and 61. Adjustable supports 60 and 61 are respectively supported by arms 64 and 65 which may be secured to the sub-base or formed integral therewith.

Suitable means may be provided for adjusting the positions of the adjustable supports with respect to supporting arms 64 and 65. In the present instance adjustable supports 60 and 61 are respectively provided with slotted arms 66 and 67. Slotted arms 66 and 67 are in turn secured to supporting arms 64 and 65 by means of bolts 68 and 69. Thus guide rod 59 may be laterally or angularly adjusted with respect to sub-base 14 and motor base 13 by releasing bolts 68 and 69, after which the rod may be fixed in the adjusted position by again tightening bolts 68 and 69.

This structure also provides means for adjusting the pulley structure to take up for belt wear. As the belt wears and becomes narrower, pulley sections 11 and 12 must be moved toward each other. This obviously may be accomplished by adjusting guide rod 59 to the position required by the decreased belt width.

The manner in which the various members of the adjustable speed drive are interlockingly adjusted, has been disclosed. Consider now the dimensional relation which must exist between the members of the adjustable speed mechanism in order to provide the required adjustments.

Figure 6:
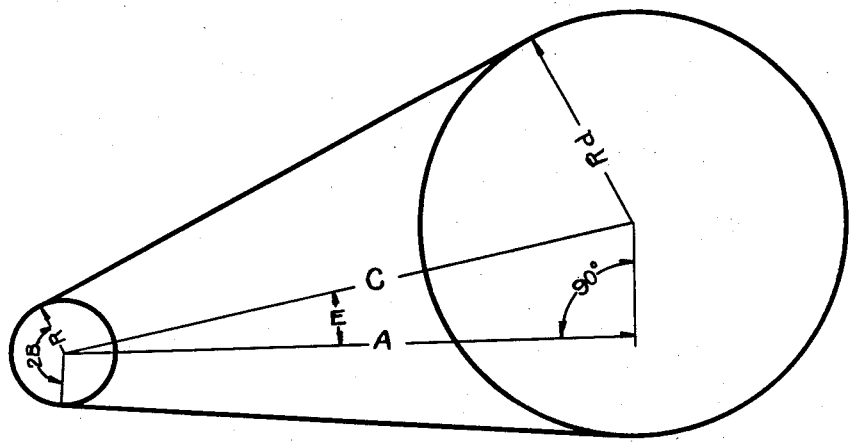
Figure 6 illustrates diagrammatically the relation of the belt, pulley and mounting dimensions.

Referring to Figure 6

Let:
L=Length of belt measured along the neutral section.
R=Effective radius of the adjustable diameter pulley.
$R_d$=Effective radius of the fixed diameter pulley.
C=Center distance between the axes of the pulley structures.
2B=Angle of contact of the belt with the adjustable diameter pulley.
E=Angle between the line normal to the axes of the driving and driven pulleys and the plane generated by the adjustment of the axis of the adjustable diameter pulley.

For a given construction L and $R_d$ are constant while the remaining dimensions are variable. The geometry of the construction gives rise to the following relations:

$$L = 2BR + (2\pi - 2B)R_d + 2C \sin B \quad (1)$$

$$R_d - R = C \cos B \quad (2)$$

From the relations of Equations (1) and (2), the following relation between the adjustment of the effective pulley radius and the adjustment of the center distance may be derived:

$$\frac{dR}{dC} = \frac{-\sin B}{B} \quad (3)$$

Consider a fixed reference plane to the right of the pulley structure of Figures 1 and 2 and perpendicular to the axes of the driving and driven shafts.

Let:
$Z_a$ be the distance of a point on pulley section 12 from the reference plane.
$Z_f$ be the distance of a point on pulley section 11 from the reference plane.
$X$ be the distance of the center line of the belt on the adjustable pulley from the reference plane.
$D$ be half of the angle included between the faces of opposing pulley sections.

Using the form of the differential the following relations may be derived:

$$dR = \frac{(dZ_f - dZ_a)}{2 \tan D} \quad (4)$$

$$dX = \frac{dZ_f + dZ_a}{2} \quad (5)$$

If the belt is to remain in alignment $dX$ must remain equal to zero.

Let:
$dz_f$ and $dz_a$ be the required values of $dZ_f$ and $dZ_a$ when $dX$ is equal to zero.

For this condition the following relation exists:

$$dz_f = -dz_a$$

Substituting this relation into Equation (4):

$$dR = \frac{dz_f}{\tan D} \quad (6)$$

Combining Equations (3) and (6):

$$\frac{dz_f}{dC} = \frac{-\tan D \sin B}{B} \quad (7)$$

Equation (7) expresses the relation of the axial adjustment of pulley section 11 to the change in center distance between the axes of the driving and driven shafts. The required angle between the reference plane and the guide members for the sliding motor base is thus a variable dependent on the angle of belt contact. Angle $B$ of Equation (7) may be expressed in terms of known dimensions by the relation of Equation (2) which may be expressed as follows:

$$B = \cos^{-1} \frac{(R_d - R)}{C} \quad (8)$$

Let:

$$F = \tan^{-1} \frac{dz_f}{dC} \quad (9)$$

Substituting Equation (9) into Equation (7):

$$\tan F = \frac{\tan D \sin B}{B} \quad (10)$$

The angle $F$ expressed by Equation (10) is the guide angle required for the sliding base when the axis of the fixed diameter pulley lies in the plane generated by the movement of the axis of the adjustable diameter pulley: that is when the angle $E$ of Figure 6 is equal to zero.

The guide angle required for the sliding base will also be a variable dependent on the particular value of angle $E$. Let $H$ be the required guide angle of the sliding base in the plane of motion of the axis of the adjustable diameter pulley. That is, $H$ is the required angle between the guide members 17 and 18 and the reference plane normal to the axes of the two shafts. The value of angle $H$ may be readily derived in the following manner. Referring to Figure 6:

$$dC = dA \cos E \quad (11)$$

$$dz_f = -dC \tan F \quad (12)$$

$$\frac{dz_f}{dA} = -\tan H \quad (13)$$

Combining Equations (11) to (13):

$$\tan H = \cos E \tan F \quad (14)$$

Combining Equations (14) and (10):

$$\tan H = \frac{\cos E \tan D \sin B}{B} \quad (15)$$

By the relation of Equations (8) and (15) the guide angle $H$, required for the sliding base, may be expressed in terms of known dimensions. The angle $H$ is a variable, as shown by Equation (15), while the construction provides a constant angle for the guide members of the sliding base. The conditions of Equation (15) may be substantially satisfied by the use of an intermediate value $H_0$ for the guide angle.

Let: $R_1$ and $R_2$ be respectively the maximum and minimum values of the effective radius of the variable diameter pulley. Thus the variable $R$ lies in the interval:

$$R_1 \geqq R \geqq R_2$$

The corresponding variables $B$, $C$, $E$, $F$ and $H$ will also have maximum and minimum values which may be expressed in the following manner:

$$C_1 \leqq C \leqq C_2$$
$$B_1 \leqq B \leqq B_2$$
$$E_1 \leqq E \leqq E_2$$
$$F_1 \leqq F \leqq F_2$$
$$H_1 \leqq H \leqq H_2$$

Corresponding to the intermediate angle $H_0$, to which the sliding base is constructed, there exist the corresponding intermediate values of the variables $B$, $C$, $R$ and $E$. Let $B_0$, $C_0$, $R_0$ and $E_0$ be these values. It is obvious that these values must also lie in the intervals:

$$H_1 \leqq H_0 \leqq H_2$$
$$B_1 \leqq B_0 \leqq B_2$$
$$C_1 \leqq C_0 \leqq C_2$$
$$R_1 \geqq R_0 \geqq R_2$$
$$E_1 \leqq E_0 \leqq E_2$$

To determine the angle $H_0$ to which the base is constructed, it is only necessary to fix the values of the variables of Equation (8). Thus:

$$B_0 = \cos^{-1} \frac{(R_d - R_0)}{C_0} \quad (16)$$

$R_d$ the radius of the fixed diameter pulley is known. The value of $C_0$ for the center distance can be established from the relative location of the motor mounting and of the driven shaft. The only value remaining to be chosen is that of $R_0$. The limits $R_1$ and $R_2$ of $R_0$ are known. For the purpose of more readily defining a value of $R_0$ let:

$$R_0 = R_2 + P(R_1 - R_2) \quad (17)$$

The value of P will obviously lie between 0 and 1.0. If the value of P is chosen in the interval between 0.4 and 0.8, the departure from the required angle will be small. A value of P equal to 0.6 is very suitable for the dimensions encountered in most constructions.

The valves of $R_0$, $C_0$ and $R_d$ having been determined, these values are substituted in Equation (16). The resultant value of $B_0$ may then be substituted in Equation (15) to obtain the value for the base angle. Thus:

$$H_0 = \frac{\tan^{-1} \cos E_0 \tan D \sin B_0}{B_0} \quad (18)$$

All of the values of Equation (18) are known. $E_0$ is determined by the mounting dimensions and by the value of $C_0$. The value of $B_0$ has already been determined. Angle D is half of the angle included between the faces of the opposing pulley sections. Thus the angle $H_0$ between the guide members 17 and 18 and the plane normal to the axis of the motor shaft is clearly defined in terms of known dimensions.

The required axial adjustment of pulley section 11 is expressed in Equation (13). Let $dZ_f$ be the axial adjustment provided by the use of the angle $H_0$. Thus:

$$dZ_f = -dA \tan H_0 \quad (19)$$

Or employing the relation of Equation (18):

$$dZ_f = \frac{-dA \cos E_0 \tan D \sin B_0}{B_0}$$

Equation (5) shows that pulley sections 11 and 12 must be equally and oppositely adjusted if the belt is to be maintained in perfect alignment. If it were possible to employ the angle H defined by Equation (15) for the guide angle, then it would be possible to adjust the remaining pulley section 12 in the manner required to maintain the belt in perfect alignment and at a constant initial tension. However, the use of the constant angle $H_0$, defined by Equation (18), eliminates the possibility of exactly satisfying both the conditions of perfect belt alignment and of constant initial belt tension. It is, however, possible to exactly satisfy one or the other of these conditions and to substantially satisfy the other.

If it is desired to maintain perfect belt alignment, the following procedure may be employed. Let $dZ_a$ be the axial adjustment provided for the adjustable pulley section 12. Equations (5) and (19) then require that the following relation be satisfied:

$$dZ_a = dA \tan H_0 \quad (20)$$

Substituting the value of $\tan H_0$ defined by Equation (18), the relation of Equation (21) is obtained:

$$\frac{dZ_a}{dA} = \frac{\cos E_0 \tan D \sin B_0}{B_0} \quad (21)$$

The relation between the axial adjustment of pulley section 12 and the lateral adjustment of the sliding motor base is clearly defined in terms of known values by the relation of Equation (21). If the relations of Equations (18) and (21) are satisfied, the belt will be maintained in perfect alignment and at a substantially constant initial tension for all positions of the adjustable pulley structure.

In many instances, it is more advantageous to maintain the belt at a constant initial tension and to allow a slight error in belt alignment. Employing the relations of Equations (3) and (4), the relation of Equation (22) may be derived:

$$\frac{dZ_a}{dC} = \frac{dZ_f}{dC} + \frac{2 \tan D \sin B}{B} \quad (22)$$

From the relations of Equations (11) and (19), the following equation may be derived:

$$dZ_f = -\frac{dC \tan H_0}{\cos E} \quad (23)$$

Let $dZ_a$ be the adjustment provided for adjustable pulley section 12, then Equations (22) and (23) give rise to the relation:

$$\frac{dZ_a}{dC} = \frac{2 \tan D \sin B}{B} - \frac{\tan H_0}{\cos E} \quad (24)$$

The value of $dZ_a$ may also be expressed by the following equations:

$$dZ_a = dA \left( \frac{2 \cos E \tan D \sin B}{B} - \tan H_0 \right)$$

$$dZ_a = dA \tan D \left( \frac{2 \cos E \sin B}{B} - \frac{\cos E_0 \sin B_0}{B_0} \right)$$

If the relations of Equations (18) and (24) are satisfied, the belt will be maintained at a constant initial tension and in substantially perfect alignment for all positions of the adjustable pulley structure. The distance which the belt falls out of alignment may be determined from Equations (5), (23), and (24), thus:

$$\frac{dX}{dC} = \left( \frac{\tan D \sin B}{B} - \frac{\tan H_0}{\cos E} \right) \quad (25)$$

Combining Equations 18) and (25):

$$\frac{dX}{dC} = \tan D \left( \frac{\sin B}{B} - \frac{\cos E_0 \sin B_0}{\cos E \, B_0} \right) \quad (26)$$

Employing the relation of Equation (11):

$$\frac{dX}{dA} = \tan D \left( \frac{\cos E \sin B}{B} - \frac{\cos E_0 \sin B_0}{B_0} \right) \quad (27)$$

Equation (27) expresses the rate at which the belt falls out of alignment as the motor structure is adjusted by means of the sliding base. Attention is drawn to the terms of Equation (27). The variables E and B, have the values $E_1$ and $B_1$ when the center distance between the pulley structure is a minimum and the values $E_2$ and $B_2$ when the center distance is a maximum.

The intermediate values $E_0$ and $B_0$ lie between the limits:

$$E_1 > E_0 > E_2$$
$$B_1 > B_0 > B_2$$

The terms of Equation (27) will consequently have the limits:

$$\frac{\cos E_1 \sin B_1}{B_1} < \frac{\cos E_0 \sin B_0}{B_0} < \frac{\cos E_2 \sin B_2}{B_2}$$

Thus the term $$\frac{dX}{dA}$$

will have a small negative value at the limit $E_1$, $B_1$; the value will then decrease to zero and finally increase to a small positive value at the limit $E_2$, $B_2$. It is of primary importance to maintain the belt in alignment when the diameter of the adjustable pulley is a maximum. Thus with the construction provided the belt may be placed in perfect alignment at or near the position for which the adjustable pulley has its maximum diameter. As the center distance is increased, the belt will fall slightly out of alignment in one direction, with a further increase in center distance the belt will move back into perfect alignment and finally fall a small distance out of alignment in the opposite direction. With the dimensions encountered in the average construction, the maximum misalignment of the belt may be restricted to a few thousandths of an inch.

The construction provided has a further possibility. Irrespective of the particular value of the guide angle $H_0$ to which the base is constructed, it is still possible to adjust the variable pulley structure to provide a constant initial belt tension for all positions of the adjustable speed drive. The relation of Equation (24) is true irrespective of the particular value of the guide angle $H_0$. Thus if the adjustment, prescribed by Equation (24), is provided for the adjustable pulley section 12, the belt will be maintained at a constant initial tension. This fact is of particular pertinence in that the requirements of any particular belt, pulley and mounting dimensions may be accommodated by adjusting the angular or lateral position of guide rod 59. If necessary the curvature of guide rod 59 may be modified to provide the adjustment prescribed by Equation (24). It is thus possible to cover a wide range of applications by the simple adjustment or replacement of guide rod 59.

As the equations show, the adjustment which must be provided for the sections of the adjustable pulley structure is a function of the angle D. As has been stated, angle D is half of the angle included between the faces of opposing pulley sections. If it is desired to employ smooth faced pulley sections, the width of the belt must be greater than the sum of the axial adjustments of the two pulley sections. Thus if W is the width of the belt and $R_1$ and $R_2$ are respectively the maximum and minimum values of the effective radius of the adjustable pulley, then:

$$W > 2(R_1 - R_2) \tan D \qquad (28)$$

The value of D commonly employed with fixed diameter pulleys is in the region of 20 to 30 degrees. For a given variation in effective radius the width of the belt varies directly as the value of tan D. It has been the common practice in variable speed drives to adopt the pulley angles used in the construction of fixed diameter pulleys. Thus, if it is desired to obtain a wide range of the effective pulley radius, a very wide belt must be employed. A wide belt of moderate thickness, however, is not able to withstand the lateral pressure of the opposing pulley faces, without buckling. Consequently various constructions have been proposed for reenforcing the belt against lateral buckling. These constructions in general employ reenforcing members such as metal or fibre slats for stiffening the belt. However, a driving member of this construction cannot be successfully operated at a high peripheral speed. Thus the construction results in a cumbersome, slow speed mechanism which operates at a high belt tension. The effect is cumulative in that a high belt tension produces a large lateral force on the belt, which in turn requires a more rigid belt and a slower operating speed.

The present construction obviates these difficulties by a careful choice of the pulley angle D. Instead of accepting the common usage, an angle D is employed, the value of which lies in the interval from 10 to 18 degrees. An angle substantially equal to 14 degrees is preferable for the dimensions encountered in most constructions. An angle substantially less than 10 degrees results in binding of the belt between the faces of the opposing pulley sections.

The tension produced in the belt by the applied load in turn produces a radial component of force which urges the belt toward the axis of the pulley structure. This radial force is opposed by the lateral force imposed on the belt by the opposing pulley sections. If the angle D is small, a very small belt tension results in an excessive lateral pressure on the belt. This lateral pressure in turn compresses the material of the belt, which allows the belt to pull far in toward the axis of the pulley. When it is time for the belt to leave the pulley, this lateral pressure grips the belt and prevents the belt from leaving the pulley structure at the point of tangency. Consequently the belt is wrapped almost completely around the pulley structure until the belt leaves the pulley at a sufficiently sharp angle to pull the belt out from between the pulley sections. When a slight overload is placed on the belt, it is not uncommon for the belt to be carried completely around the pulley structure, which results either in the tearing of the belt or the failure of the associated mechanism.

By employing a value for the angle D substantially equal to 14 degrees, a wide variation in effective pulley diameter may be obtained with the use of a belt of moderate width. Consequently it is possible to employ relatively flexible belts of a fabric and composition construction. A flexible belt in turn permits the use of high peripheral speeds and small pulley diameters. It is thus possible to directly drive the adjustable pulley structure by motors having a speed as high as 7200 revolutions per minute. In contradistinction drives employing the conventional wide pulley angles and belts with external reenforcing members cannot be successfully operated at pulley speeds greater than 1000 revolutions per minute. If wide pulley angles are employed in combination with belts which do not have reenforcing members, the power capacity of the drive is very limited. Such constructions are uneconomical and cannot be successfully operated at more than fractional horsepower ratings.

The present construction provides a belt and pulley structure which has an increased life and operating efficiency. The life of the belt has been increased by decreasing the lateral pressure on the belt. The decreased lateral pressure in turn provides a drive having lower frictional losses and an increased efficiency.

In the disclosure, the adjustable pulley structure has been referred to as mounted on the driving pulley. It is obvious that installations may arise for which it is convenient to place the adjustable pulley on the driven shaft. In such instances, the present construction can be readily modified to permit the mounting of the adjustable pulley structure on the driven shaft.

I claim:

1. In an adjustable speed drive having a belt in active power transmitting relation to a driving pulley structure and to a driven pulley structure, one of said pulley structures having a positively adjustable effective diameter, and the center distance between the axes of said pulley structures being variable, the combination therewith of positive means for adjusting the center distance between the axes of said pulley structures, means for adjusting the effective diameter of said positively adjustable pulley structure in accordance with the adjustment of said center distance, means for interlocking said center distance adjusting means with said pulley diameter adjusting means, and means for adjusting the relative rates of adjustment of said center distance and of the effective diameter of said adjustable pulley structure.

2. In an adjustable speed drive, an electric motor having a shaft, an adjustable pulley structure in axial driving relation to said shaft, said adjustable pulley structure having a pair of pulley sections with opposed inclined belt engaging faces forming by relative axial adjustment variable effective pulley diameters, means for securing one of said pulley sections in adjusted axial position with respect to said motor shaft, a hub provided for the other of said pulley sections, a bearing structure axially fixed to said hub, means for supporting said bearing structure and for permitting axial movement thereof, a driven shaft, a pulley structure in axial driving relation to said driven shaft, a belt in active driving relation to said pulley structures, an adjustable base having means for supporting said electric motor, positive means for adjusting the position of said adjustable base to adjust the center distance between the axes of said pulley structures, interlocking means for adjusting the axial position of said bearing structure and the pulley section associated therewith in response to the adjustment of said center distance, means for securing said bearing structure to said hub in a multiplicity of relative axial positions.

3. In an adjustable speed drive, a driving pulley structure and a driven pulley structure, one of said pulley structures having an adjustable effective diameter, said adjustable pulley structure having a pair of pulley sections with opposed inclined belt engaging faces forming by relative axial adjustment variable effective pulley diameters, a belt in active driving relation to said pulley structures, a pair of shafts in respective axial driving relation to each of said pulley structures, means for rotatably supporting said shafts, a supporting structure having means for supporting said adjustable pulley structure and the shaft associated therewith, an adjustable base having means for supporting said supporting structure, a sub-base having means for supporting said adjustable base, guide means cooperating with said adjustable base and said sub-base for guiding the relative motion thereof, means for adjusting the position of said adjustable base to adjust the center distance between the axes of said pulley structures, interlocking means cooperating with said sub-base and said adjustable pulley structure for adjusting the relative axial position of said pulley sections in response to the adjustment of said center distance, and means for adjusting said interlocking means to substantially provide the adjustment of said adjustable pulley structure required by the dimensional relations of said belt and pulley structures.

4. In an adjustable speed drive, an electric motor having a frame and a shaft, an adjustable pulley structure in axial driving relation to said shaft, said adjustable pulley structure having a pair of pulley sections with opposed inclined belt engaging faces forming by relative axial adjustment variable effective pulley diameters, a driven pulley structure, a rotatably supported shaft in axial driving relation to said driven pulley structure, a belt in active driving relation to said pulley structures, an adjustable base having means for supporting said electric motor, a supporting base having means for supporting said adjustable base, and interlocking means for adjusting the center distance between the axes of said pulley structures and for adjusting the effective diameter of said adjustable pulley structure, said means for adjusting the effective diameter of said adjustable pulley structure including; a hub provided for one of said pulley sections, an axially adjustable bearing structure secured to said hub, a shift arm engaging said axially adjustable bearing structure, and guide means supported by said supporting base and engaging said shift arm, whereby the adjustment of said adjustable pulley structure is interlocked with the adjustment of said center distance.

5. The structure as set forth in claim 4, in which said shift arm is provided with a pivotable support supported by said adjustable base.

6. In an adjustable speed drive, an electric motor having a frame and a shaft, an adjustable pulley structure in axial driving relation to said shaft, said adjustable pulley structure having a pair of pulley sections with opposed inclined belt engaging faces, forming by relative axial adjustment variable effective pulley diameters, a rotatably supported driven shaft, a belt in active driving relation to said pulley structures, positive means for adjusting the center distance between the axes of said pulley structures, and means for adjusting the effective diameter of said adjustable pulley structure, said means for adjusting the effective diameter of said adjustable pulley structure including; a hub provided for one of said pulley sections, a bearing axially secured to said hub, an axially adjustable member supported by the frame of said electric motor and secured to said bearing, means for preventing rotation of said axially adjustable member and for permitting axial movement thereof, and means for adjusting the axial position of said axially adjustable member.

7. In an adjustable speed drive having a belt in active driving relation to a pair of pulley structures, one of said pulley structures having an adjustable effective diameter and including a pair of relatively axially adjustable pulley sections, and in which means are provided for adjusting the center distance between the axes of said pulley structures, the combination therewith of an electric motor having a frame and a shaft, said shaft being in axial driving relation to said adjustable pulley structure, slidable means for supporting one of said pulley sections for movement in an axial direction, and lubricating passages formed in said frame and said slidable supporting means, whereby lubricant may be supplied to the supporting surfaces of the relatively movable members of said frame and of said adjustable pulley structure during the continuous operation of said drive in a power transmitting capacity.

8. In an adjustable speed drive, having a belt in active driving relation to a pair of pulley structures, one of said pulley structures including a pair of pulley sections with opposed inclined belt engaging faces, forming by relative axial adjustment variable effective pulley diameters, and the center distance between the axes of said pulley structures being variable, the combination therewith of interlocking means for adjusting the center distance between the axes of said pulley structures and for adjusting the axial positions of said pulley sections by substantially equal and opposite amounts with respect to said driving belt, in substantial accordance with the dimensional requirements of said belt and pulley structures, and means for supplementarily adjusting the axial positions of said pulley sections to accommodate belts of various dimensions.

9. In an adjustable speed drive, having a belt in active driving relation to a pair of pulley structures, one of said pulley structures including a pair of pulley sections with opposed inclined belt engaging faces, forming by relative axial adjustment variable effective pulley diameters, and the center distance between the axes of said pulley structures being variable, the combination therewith of interlocking means for adjusting the center distance between the axes of said pulley structures and for adjusting the axial positions of said pulley sections by substantially equal and opposite amounts with respect to said driving belt, in substantial accordance with the dimensional requirements of said belt and pulley structures, and means for supplementarily adjusting the members of said adjustable speed drive to accommodate particular belt, pulley and mounting dimensions.

10. In an adjustable speed drive, an electric motor having a frame and a shaft, a driving pulley structure in axial driving relation to said shaft, a driven shaft, a driven pulley structure in axial driving relation to said driven shaft, a belt for transmitting power between said pulley structures, one of said pulley structures having an adjustable effective diameter, said adjustable pulley having a pulley section axially fixed to its respective shaft and a pulley section axially adjustable with respect to said shaft, said pulley sections having opposed inclined faces, forming by relative axial adjustment variable effective pulley diameters, means for adjustably mounting said electric motor for movement in the direction required to vary the center distance between the axes of said pulley structures, and interlocking means for adjusting the center distance between the axes of said pulley structures and for adjusting the axial position of said axially adjustable pulley section.

11. In an adjustable speed drive, a driving pulley structure and a driven pulley structure, a belt for transmitting power between said pulley structures, one of said pulley structures having an adjustable effective diameter and including a pair of pulley sections with opposed inclined faces, forming by relative axial adjustment variable effective pulley diameters, means for adjusting the center distance between the axes of said pulley structures, and means for adjusting the relative axial position of the pulley sections of said adjustable pulley structure in accordance with the adjustment of said center distance, said last mentioned means including a bearing structure axially fixed to one of said pulley sections, means for adjusting the axial position of said bearing structure, and means for securing the bearing structure to said pulley section in a plurality of relative axial positions.

12. In an adjustable speed drive, a driving pulley structure and a driven pulley structure, a belt for transmitting power between said pulley structures, one of said pulley structures having an adjustable effective diameter and including a pair of pulley sections with opposed inclined faces, forming by relative axial adjustment variable effective pulley diameters, means for adjusting the center distance between the axes of said pulley structures, means for adjusting the relative axial position of the pulley sections of said adjustable pulley structure to adjust the effective pulley diameter, means for interlocking said center distance adjusting means with said pulley diameter adjusting means, and means for adjusting said interlocking means to vary the relative rates of adjustment of said center distance and of the effective diameter of said adjustable pulley structure.

13. In an adjustable speed drive in which there are two pulley structures and a belt connecting the structures for transmitting power from one structure to the other structure, said pulley structures being respectively in axial driving relation to a pair of rotatably supported shafts, and in which one of the pulley structures has a pulley section axially fixed with respect to its respective shaft and a pulley section axially adjustable with respect to said shaft, the pulley sections having opposed inclined belt engaging faces, forming by relative axial adjustment variable effective pulley diameters, and in which the center distance between the axes of said pulley structures is variable, the combination therewith of a guide for one of said pulley structures, said guide forming an angle $H_0$ with the plane perpendicular to the axes of said pulley structures, whereby the pulley structure is moved axially as it is moved along the guide to vary the center distance between the axes of said pulley structures, and interlocking means for moving said pulley structure along said guide to adjust said center distance and for adjusting the axial position of said axially adjustable pulley section, the angle $H_0$ of said guide being related to the dimensions of said belt and pulley structures according to the following equation:

$$\tan H_0 = \frac{\tan D \sin B_0}{B_0}$$

where:
$D$ = one half the included angle between the faces of the opposite pulley sections, and
$B_0$ = one half the angle of contact of the belt with the adjustable diameter pulley at an intermediate value of the effective pulley diameter.

14. In an adjustable speed drive, an electric motor having a frame and a shaft, a driving pulley structure in axial driving relation to said motor shaft, a driven shaft, a driven pulley structure in axial driving relation to said driven shaft, a belt for transmitting power between said pulley structures, one of said pulley structures having an adjustable effective diameter and including a pulley section fixed to its respective shaft and a pulley section axially adjustable with respect to said shaft, said pulley sections having opposed inclined faces, forming by relative axial adjustment variable effective pulley diameters, means for positively adjusting the position of said electric motor to vary the center distance between the axes of said pulley structures, and means for positively adjusting the axial position of said axially adjustable pulley section.

DON HEYER.